United States Patent
Shin et al.

(10) Patent No.: US 10,130,226 B2
(45) Date of Patent: Nov. 20, 2018

(54) VACUUM CLEANER AND DUST COLLECTING APPARATUS

(71) Applicant: LG ELECTRONICS INC., Seoul (KR)

(72) Inventors: Jinhyouk Shin, Seoul (KR); Sungjun Kim, Seoul (KR); Minseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 14/955,478

(22) Filed: Dec. 1, 2015

(65) Prior Publication Data

US 2016/0150929 A1    Jun. 2, 2016

(30) Foreign Application Priority Data

Dec. 1, 2014  (KR) .................. 10-2014-0169814

(51) Int. Cl.
*B01D 50/00* (2006.01)
*A47L 9/10* (2006.01)
(Continued)

(52) U.S. Cl.
CPC .............. *A47L 9/108* (2013.01); *A47L 9/12* (2013.01); *A47L 9/1625* (2013.01);
(Continued)

(58) Field of Classification Search
CPC .......... A47L 9/108; A47L 9/1633; A47L 9/12; A47L 9/1625; A47L 9/1641;
(Continued)

(56) References Cited

U.S. PATENT DOCUMENTS 2,553,175 A * 5/1951 Davenport ............... B04C 5/24
                                                           55/343
7,867,307 B2 * 1/2011 Bates ................ A47L 9/1633
                                                           55/343
(Continued)

FOREIGN PATENT DOCUMENTS

CN        101023852        8/2007
CN        102772175        11/2012
(Continued)

OTHER PUBLICATIONS

European Search Report dated May 4, 2016 issued in Application No. 15197300.5.
(Continued)

*Primary Examiner* — Dung H Bui
(74) *Attorney, Agent, or Firm* — Ked & Associates, LLP

(57) ABSTRACT

A dust collecting apparatus may include a first dust separator configured to separate dust from suctioned air; a first dust storage chamber configured to store the dust separated in the first dust separator; a support tube and a pressing plate coupled to the support tube; a second dust separator configured to separate dust from the air which has passed through the first dust separator; and a second dust storage chamber configured to store the dust separated in the second dust separator, and located inside of the support tube.

18 Claims, 10 Drawing Sheets

(51) Int. Cl.
  *B01D 45/16* (2006.01)
  *A47L 9/16* (2006.01)
  *A47L 9/12* (2006.01)
(52) U.S. Cl.
  CPC .......... *A47L 9/1633* (2013.01); *A47L 9/1641* (2013.01); *A47L 9/1683* (2013.01); *B01D 45/16* (2013.01); *B01D 50/002* (2013.01)
(58) Field of Classification Search
  CPC ..... A47L 9/1683; B01D 45/16; B01D 50/002; B01D 45/12; B01D 46/2411
  See application file for complete search history.

(56) References Cited

U.S. PATENT DOCUMENTS

| | | | | |
|---|---|---|---|---|
| 7,958,598 B2* | 6/2011 | Yun | A47L 9/108 15/347 |
| 7,976,597 B2* | 7/2011 | Smith | A47L 9/1625 15/352 |
| 7,992,252 B2* | 8/2011 | Park | A47L 9/0081 15/323 |
| 7,998,234 B2* | 8/2011 | Hwang | A47L 5/365 55/428 |
| 8,012,250 B2* | 9/2011 | Hwang | A47L 5/365 55/429 |
| 8,151,409 B2* | 4/2012 | Ha | A47L 9/108 15/327.2 |
| 8,544,143 B2* | 10/2013 | Hwang | A47L 9/108 15/352 |
| 8,679,211 B1* | 3/2014 | Makarov | A47L 9/1641 55/343 |
| 8,713,752 B2* | 5/2014 | Kang | A47L 9/108 15/347 |
| 8,978,197 B2* | 3/2015 | Kang | A47L 9/108 15/347 |
| 9,226,630 B2* | 1/2016 | Chong | A47L 9/108 |
| 9,668,629 B2* | 6/2017 | Hyun | A47L 9/108 |
| 2005/0198767 A1* | 9/2005 | Kang | A47L 9/106 15/353 |
| 2006/0123590 A1* | 6/2006 | Fester | A47L 9/122 15/353 |
| 2007/0143953 A1 | 6/2007 | Hwang et al. | |
| 2008/0172994 A1* | 7/2008 | Courtney | A47L 9/1625 55/345 |
| 2008/0184681 A1* | 8/2008 | Oh | A47L 9/1625 55/345 |
| 2008/0256911 A1* | 10/2008 | Oh | A47L 9/0081 55/346 |
| 2009/0100810 A1 | 4/2009 | Smith | |
| 2009/0193771 A1* | 8/2009 | Oh | A47L 9/1633 55/337 |
| 2009/0249578 A1* | 10/2009 | Hwang | A47L 5/365 15/352 |
| 2009/0255083 A1* | 10/2009 | Hwang | A47L 9/108 15/347 |
| 2009/0266382 A1* | 10/2009 | Hwang | A47L 5/365 134/21 |
| 2010/0005617 A1* | 1/2010 | Hyun | A47L 9/1625 15/347 |
| 2010/0139033 A1* | 6/2010 | Makarov | A47L 9/1625 15/353 |
| 2010/0263161 A1* | 10/2010 | Lee | A47L 5/362 15/347 |
| 2011/0000047 A1* | 1/2011 | Ji | A47L 9/108 15/347 |
| 2011/0099749 A1* | 5/2011 | Chong | A47L 9/108 15/352 |
| 2011/0099750 A1* | 5/2011 | Chong | A47L 9/102 15/352 |
| 2011/0209303 A1* | 9/2011 | Kim | A47L 9/108 15/347 |
| 2012/0011679 A1* | 1/2012 | Chong | A47L 9/108 15/352 |
| 2012/0180253 A1* | 7/2012 | Hwang | A47L 9/108 15/339 |
| 2015/0107047 A1* | 4/2015 | Hyun | A47L 9/149 15/352 |
| 2016/0088988 A1* | 3/2016 | Eo | A47L 9/08 15/353 |
| 2016/0088989 A1* | 3/2016 | Hyun | B01D 50/002 15/353 |
| 2016/0113463 A1* | 4/2016 | Hyun | A47L 9/1625 55/337 |
| 2016/0150929 A1* | 6/2016 | Shin | A47L 9/108 55/322 |
| 2016/0150931 A1* | 6/2016 | Kim | A47L 9/108 15/353 |

FOREIGN PATENT DOCUMENTS

| | | |
|---|---|---|
| JP | 2009-056039 | 3/2009 |
| JP | 2009-285238 A | 12/2009 |
| JP | 4904226 B2 | 3/2012 |
| JP | 2014-111215 A | 6/2014 |
| JP | 5583166 B2 | 9/2014 |
| KR | 10-2010-0108839 A | 10/2010 |
| KR | 10-2011-0048511 A | 5/2011 |
| WO | WO 02/067752 | 9/2002 |

OTHER PUBLICATIONS

Korean Office Action dated Dec. 8, 2015 issued in Application No. 10-2014-0169814.

Chinese Office Action dated Aug. 17, 2017 issued in Application No. 201510848563.0.

* cited by examiner

VACUUM CLEANER AND DUST COLLECTING APPARATUS

CROSS-REFERENCE TO RELATED APPLICATION

This application claims priority under 35 U.S.C. § 119 to Korean Application No. 10-2014-0169814, filed in Korea on Dec. 1, 2014, whose entire disclosure is hereby incorporated by reference.

BACKGROUND

1. Field

A vacuum cleaner and a dust collecting apparatus are disclosed herein.

2. Background

Generally, a vacuum cleaner is an apparatus which suctions dust and foreign substances scattered on a surface to be cleaned using a suction motor installed at an inside of a main body and then filters the dust and the foreign substances in the main body. The vacuum cleaner having such a function may be classified into an up-right type in which a suction nozzle as an inlet port is integrally formed with the main body, and a canister type in which the suction nozzle is in communication with the main body through a connection pipe. For example, an up-right type vacuum cleaner is disclosed in Korean Unexamined Patent Application Publication No. 2011-0048511.

The above references are incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein.

DETAILED DESCRIPTION

Figure 1:
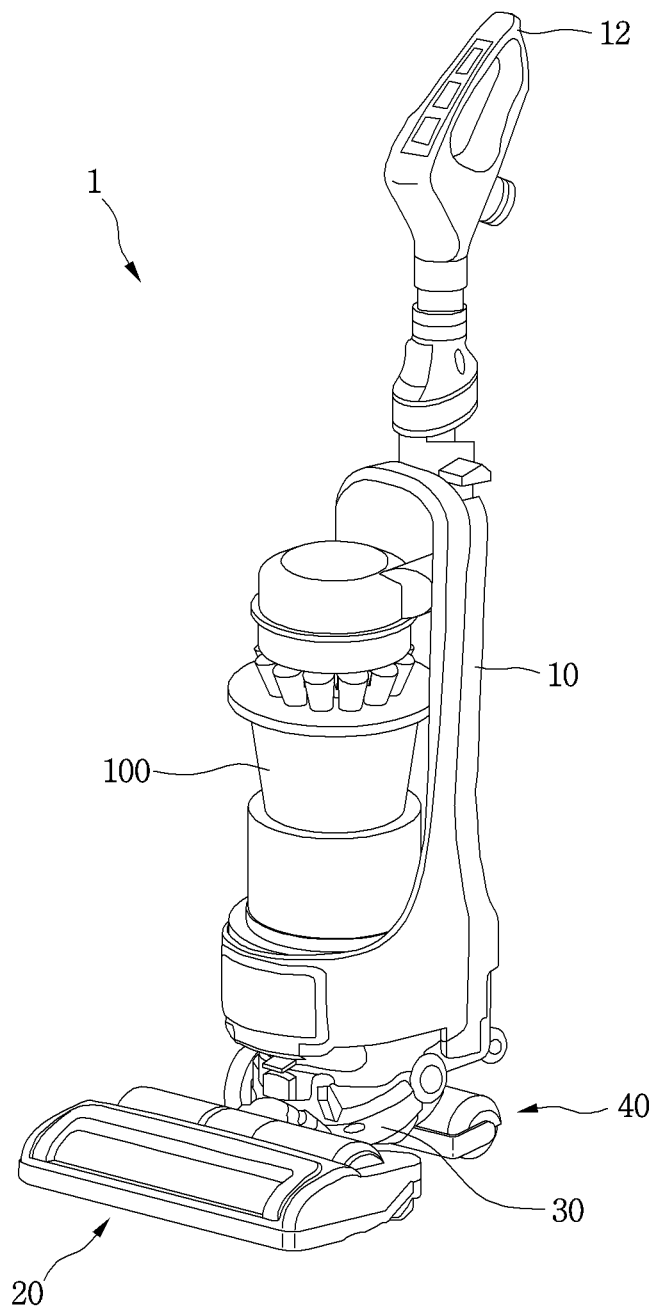
FIG. 1 is a perspective view of a vacuum cleaner according to an embodiment of the present disclosure.
Figure 2:
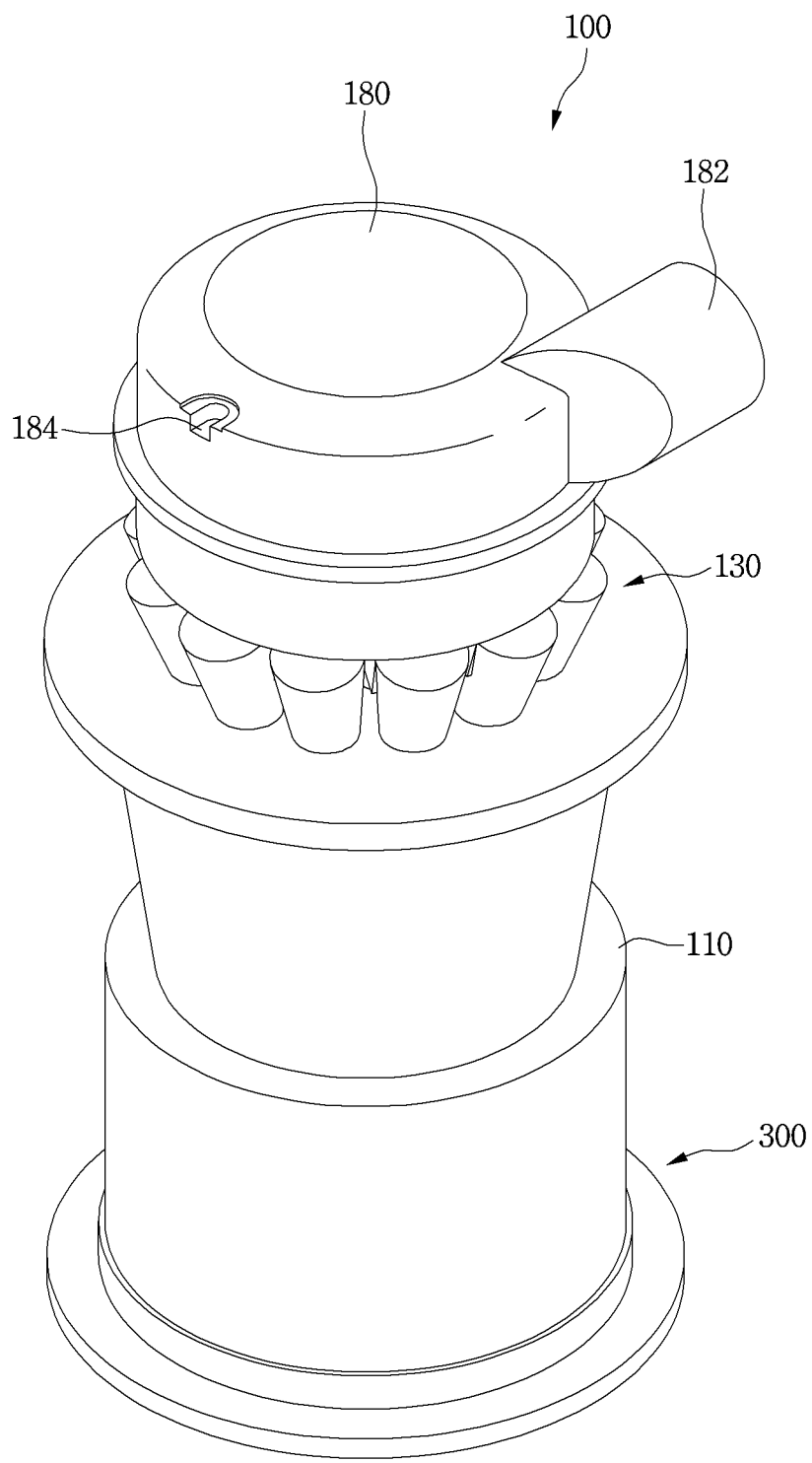
FIG. 2 is a perspective view of a dust collecting apparatus according to the embodiment of the present disclosure.

FIG. 1 illustrates an example in which a dust collecting apparatus is installed at an up-right type vacuum cleaner.

However, the dust collecting apparatus may also be applied to a canister type vacuum cleaner. Referring to FIG. 1, a vacuum cleaner 1 according to an embodiment of the present disclosure may include a cleaner body 10 having a suction motor which generates a suction force, and a suction nozzle 20 which is in communication with the cleaner body 10 and suctions air containing dust.

The vacuum cleaner 1 may further include a supporter 30 which enable a position of the cleaner body 10 to be varied with respect to the suction nozzle 20, and a wheel assembly 40 which is rotatably connected with the supporter 30. An air path through which air flows may be provided at an inside of the supporter 30. Therefore, air suctioned through the suction nozzle 20 may pass through the supporter 30 and then may flow to the cleaner body 10.

The vacuum cleaner 1 may further include a dust collecting apparatus 100 which is separably installed at the cleaner body 10. The dust collecting apparatus 100 may be separably installed at an installation part 13 which is formed at a front portion of the cleaner body 10. The dust collecting apparatus 100 serves to separate dust from the air suctioned into the cleaner body 10 and to store the separated dust.

Referring to FIGS. 1 to 5, the dust collecting apparatus 100 may include a dust collecting body 110. The dust collecting body 110 may include a first dust storage 113. The dust collecting body 110 may further include a first dust separator 112 having a first inlet port 111. The first dust storage 113 may be integrally formed with the first dust separator 112 or may be coupled to the first dust separator 112 by a coupling member. Alternatively, the first dust separator 112 may be separately provided from the dust collecting body 110, may be connected with the dust collecting body 110, and may be in communication with the first dust storage 113.

As an example, the first dust separator 112 may be formed in a truncated cone shape, and the first dust storage 113 may be formed in a cylindrical shape. A diameter of the first dust separator 112 may be gradually reduced downward, and a lower diameter of the first dust separator 112 may be smaller than an upper diameter of the first dust storage 113. Alternatively, the first dust separator 112 may be formed in the cylindrical shape. In the embodiment, the shapes of the first dust separator 112 and the first dust storage 113 are not limited. The first dust separator 112 may separate dust from the air using a cyclone principle.

The dust collecting apparatus 100 may further include a filter part or component 120 which filters the air separated from the dust in the first dust separator 112. The filter part 120 may include a filter body 121. The filter body 121 may include one or more holes 122 through which the air passes. The filter body 121 may support a second dust separator 130. A support rib 123 which supports the second dust separator 130 may be provided at an upper side of the filter body 121. A rounded support groove 124 may be provided at the support rib 123.

The dust collecting apparatus 100 may further include the second dust separator 130 which suctions the air primarily separated from the dust by the first dust separator 112 and separates once more the dust from the suctioned air. A part of the second dust separator 130 may be located at an inside of the dust collecting body 110, and another part thereof may be located at an outside of the dust collecting body 110.

The second dust separator 130 may include a plurality of cyclones or cyclone parts. The plurality of cyclone parts may include a plurality of first cyclones or cyclone parts 131, and one or more second cyclones or cyclone parts 133 which is located within an area formed by the plurality of first cyclone parts 131.

Cyclone flow axes of the plurality of first cyclone parts 131 may be disposed not to be in parallel with cyclone flow axes of the one or more second cyclone parts 133. For example, the cyclone flow axes of the second cyclone parts 133 may be disposed in parallel with a vertical line, and each of the cyclone flow axes of the plurality of first cyclone parts 131 may be disposed to be inclined with respect to the vertical line. For example, the plurality of first cyclone parts 131 may be disposed in a ring shape. Since the plurality of first cyclone parts 131 are disposed in the ring shape, the one or more second cyclone parts 133 may be located within the area formed by the plurality of first cyclone parts 131.

According to the embodiment, since the one or more second cyclone parts 133 are located at the area among the plurality of first cyclone parts 131, the number of cyclone parts may be increased, an amount of the air flowing through the second dust separator 130 may be increased, and thus dust separation performance in the second dust separator 130 may be enhanced. The fact that an amount of the flowing air is large means that the air may smoothly flow, and when the air flows smoothly, air-dust separation performance in each cyclone part may be enhanced.

In the embodiment, since the one or more second cyclone parts 133 are located at the area among the plurality of first cyclone parts 131, a size of the second dust separator 130 is prevented from being increased, even though the number of cyclone parts is increased, and thus the second dust separator 130 may have a compact structure. Each of the cyclone parts 131 and 133 may include a second inlet port 132 through which the air is suctioned.

The air passed through the filter part 120 may be divided and flow into the second inlet port 132 of each of the cyclone parts 131 and 133. The plurality of cyclone parts 131 and 133 may be disposed in parallel. Each of the first cyclone parts 131 may be seated in the support groove 124 of the support rib 123 of the filter body 121. A part of each of the cyclone parts 131 and 133 may be accommodated in the filter body 121.

The second dust separator 130 may further include a supporter 136 which supports a filter mechanism or filter components 170. The supporter 136 may have an air guide 137 which is inserted into each of the cyclone parts 131 and 133 and guides a discharge of the air separated from the dust.

The second dust separator 130 may further include a dust discharge guide 138 which guides a discharge of the dust separated from the air in each of the cyclone parts 131 and 133. The dust discharged from each of the cyclone parts 131 and 133 may fall down through the dust discharge guide 138.

The dust collecting apparatus 100 may further include the filter mechanism 170 which filters the air discharged from the second dust separator 130. The filter mechanism 170 may include a filter frame 172, and a filter 174 which is accommodated in the filter frame 172. The filter frame 172 may be seated at the second dust separator 130. For example, the filter frame 172 may be seated at the supporter 136.

The dust collecting apparatus 100 may further include an exhaust cover 180. The exhaust cover 180 may be seated on the second dust separator 130. The exhaust cover 180 may cover the filter mechanism 170, while being seated on the second dust separator 130. The exhaust cover 180 may include an air discharge port 182 through which the air is discharged. The air discharged from the air discharge port 182 may be introduced into the cleaner body 10. The exhaust cover 180 may have a fastener or a fastening part 184 which is fastened to the second dust separator 130. For example, the exhaust cover 180 may be fastened to the supporter 136 of the second dust separator 130.

The dust collecting apparatus 100 may further include a second dust storage 150 which stores the dust separated in the second dust separator 130. At least a part of the second dust storage 150 may be located within the first dust storage 113. The second dust storage 150 may be connected to a lower side of the second dust separator 130. For example, the dust discharge guide 138 of the second dust separator 130 may be seated on the second dust storage 150.

A part of the second dust storage 150 may be located within the filter part 120. For example, a part of the second dust storage 150 may be located within the filter body 121. The second dust storage 150 may be located within the filter body 121, and may include a dust introduction guide 151 which is connected with the dust discharge guide 138 and guides an introduction of the dust, and a storage body 152 which extends downward from the dust introduction guide 151 and forms a space for storing the dust. For example, the storage body 152 may be formed in a cylindrical shape, and the dust introduction guide 151 may be formed in a cylindrical shape or a truncated cone shape.

A seating part or support 153 at which the second dust separator 130 is seated may be provided at the dust introduction guide 151. The dust introduction guide 151 may have a fastener or a fastening part 154 which is fastened to the second dust separator 130.

The dust collecting apparatus 100 may further include a compressing unit or components to compress the dust stored in the first dust storage 113. The compressing unit may include a pressing member 200 which is rotatably disposed in the first dust storage 113. Further, the compressing unit may further include a fixed member or a wall 250 of which a position is fixed in the first dust storage 113. The fixed member 250 may be omitted according to a type of the first dust storage 113. In this case, a part of the first dust storage 113 may serve as the fixed member.

The pressing member 200 may be rotatably connected to the second dust storage 150. The fixed member 250 may be integrally formed with the first dust storage 113, or may be coupled to an inner circumferential surface of the first dust storage 113 so that the position thereof is fixed. The pressing member 200 may be rotated in one direction or two directions within the first dust storage 113. While the pressing member 200 is rotated, the dust between the pressing member 200 and the fixed member 250 may be compressed.

The pressing member 200 may include a pressing plate support part or cylinder 210 having a hollow portion 211, and a pressing plate 220 which is supported by the pressing plate support part 210. The pressing plate 220 may be integrally formed with the pressing plate support part 210, or may be coupled to the pressing plate support part 210. The pressing plate 220 may extend radially from the pressing plate support part 210.

Figure 3:
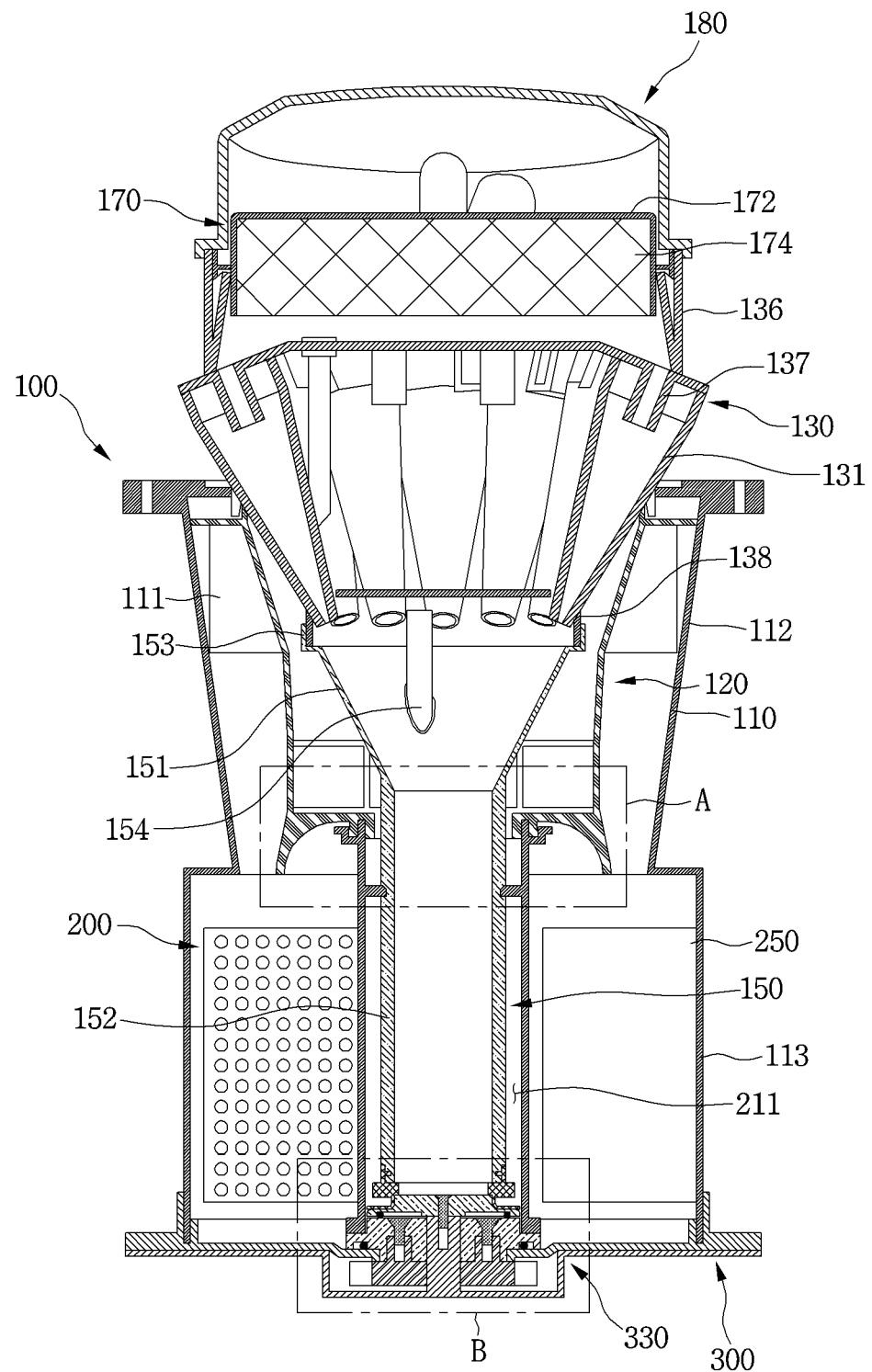
FIG. 3 is a cross-sectional view of the dust collecting apparatus of FIG. 2.
Figure 4:
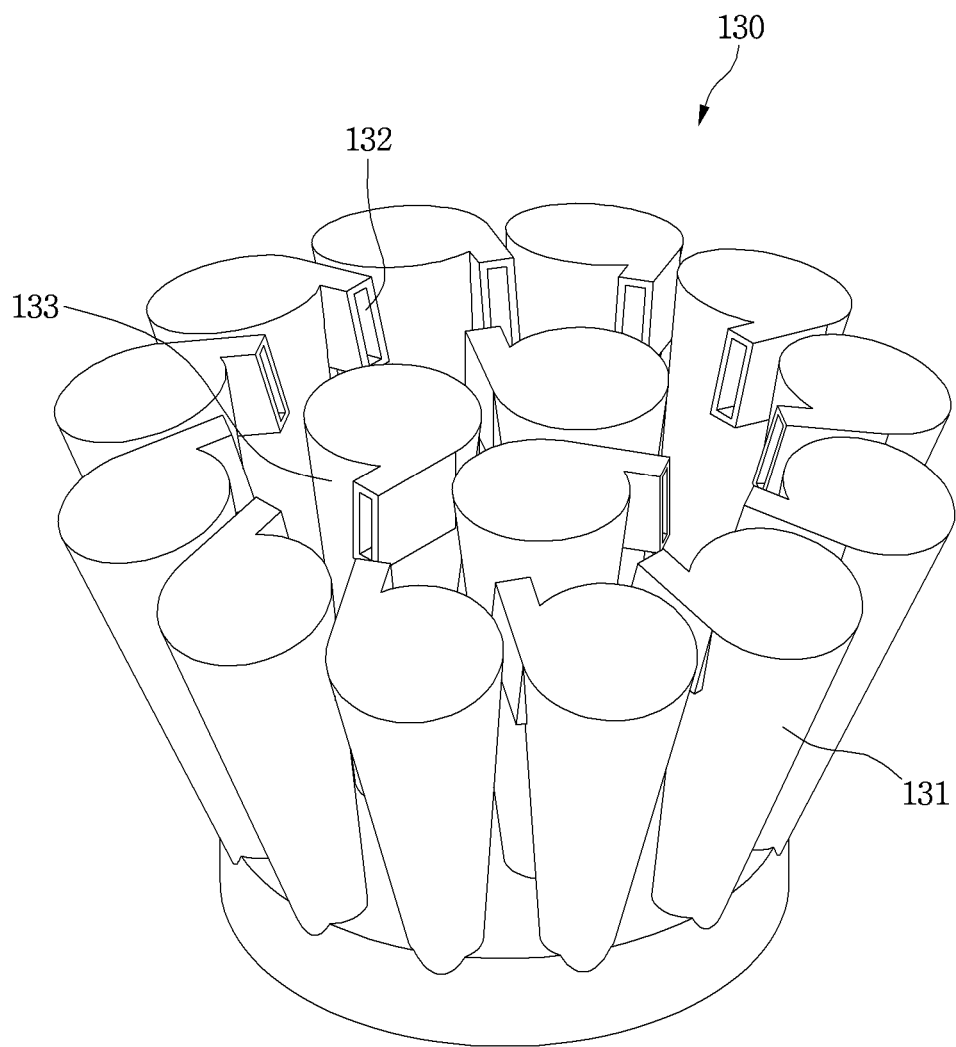
FIG. 4 is a partial perspective view of a second dust separator according to the embodiment of the present disclosure.

A part or the whole of the second dust storage 150 may be located at an inside of the pressing member 200. For example, a part or the whole of the second dust storage 150 may be located in the hollow portion 211 of the pressing plate support part 210. To this end, an outer diameter of the second dust storage 150 may be the same as or smaller than an inner diameter of the pressing plate support part 210. FIG. 3 illustrates an example in which the outer diameter of the second dust storage 150 is smaller than the inner diameter of the pressing plate support part 210.

While the pressing member 200 is rotated, the pressing plate support part 210 may be prevented from interfering with the second dust storage 150. Since the second dust storage 150 is located in the hollow portion 211 of the pressing plate support part 210, the dust may be stored in the second dust storage 150, and also a volume or a size of the dust collecting apparatus 100 may be prevented from being increased due to the second dust storage 150.

The pressing plate 220 may include one or more holes 222 through which the air between the pressing plate 220 and the fixed member 250 passes while the pressing member 200 is rotated toward the fixed member 250. Since the air remaining in the first dust storage 113 may pass through the one or more holes 222 while the dust is compressed, the dust may be prevented from being scattered due to rising of the air in the first dust storage 113, and may also be prevented from flowing back toward the first dust separator 112.

The dust collecting apparatus 100 may further include a cover assembly 300 which simultaneously opens and closes the first dust storage 113 and the second dust storage 150. The cover assembly 300 may include a first cover 310 which opens and closes the first dust storage 113. The first cover 310 may be connected to a lower side of the dust collecting body 110. At this time, the first cover 310 may be separably connected to the lower side of the dust collecting body 110, or may be rotatably connected to the lower side of the dust collecting body 110 by a hinge. The first cover 310 may include a first coupling rib 311 and a second coupling rib 312 for coupling with the dust collecting body 110.

Each of the first coupling rib 311 and the second coupling rib 312 may extend upward from an upper surface of the first cover 310, and may be formed in a circular ring shape. The first coupling rib 311 and the second coupling rib 312 may be spaced apart from each other. The lower side of the dust collecting body 110 may be inserted between the first coupling rib 311 and the second coupling rib 312. Since the lower side of the dust collecting body 110 may be inserted between the first coupling rib 311 and the second coupling rib 312, a separate sealing member is not needed. The cover assembly 300 may further a transmission mechanism which transmits power from an outside to the pressing member 200. The transmission mechanism may include a first transmission part or gear 330 and a second transmission part or gear 340. The first transmission part 330 may be disposed at one side of the first cover 310, and the second transmission part 340 may be disposed at the other side of the first cover 310. For example, at least a part of the first transmission part 330 is disposed at a lower side of the first cover 310, and at least a part of the second transmission part 340 may be disposed at an upper side of the first cover 310.

The first transmission part 330 may be connected with a driving unit which will be described. The second transmission part 340 may be connected with the pressing member 200. The first cover 310 may have an opening 314 through which one or more of the first transmission part 330 and the second transmission part 340 pass. The cover assembly 300 may further include a transmission part or gear cover 320 which covers the first transmission part 330.

The transmission part cover 320 may be fastened to the first cover 310. A first fastening hole 315 may be formed at the first cover 310, and a second fastening hole 325 may be formed at the transmission part cover 320. The transmission part cover 320 may be fastened to the lower side of the first cover 310. The transmission part cover 320 may include a support part 322 which supports the first transmission part or pad 330. The support part 322 may be formed by recessing a part of the transmission part cover 320 downward.

A shaft 326 which passes through the first transmission part 330 may be provided at the support part 322. The shaft 326 may be integrally formed with the support part 322 or may be coupled to the support part 322. The first transmission part 330 may be rotated about the shaft 326. The shaft 326 may also pass through the second transmission part 340.

The transmission part cover 320 may further include an exposure part or an opening 324 through which the first transmission part 330 is exposed to an outside. For example, the exposure part 324 may be a cut-away part which is formed by cutting away a part of the first transmission part 330. The cover assembly 300 may further include a second cover 350 which opens and closes the second dust storage 150. While the second dust storage 150 is closed by the second cover 350, the second cover 350 may be located within the pressing plate support part 210 of the pressing member 200.

When the second cover 350 is located within the pressing plate support part 210, interference between the pressing plate support part 210 and the second cover 350 may be prevented, and the pressing plate support part 210 may serve as a sealing wall. To prevent the dust in the second dust storage 150 from leaking to an outside of the second dust storage 150, a sealing member 360 may be coupled to the second cover 350 or the second dust storage 150. FIG. 3 illustrates an example in which the sealing member 360 is coupled to the second dust storage 150.

Figure 6:
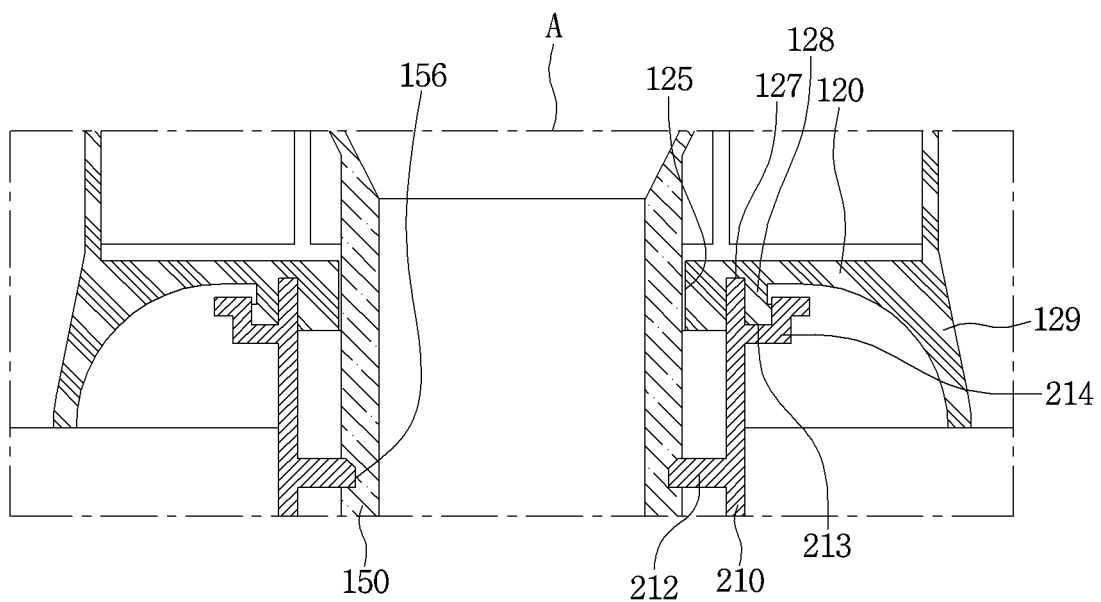
FIG. 6 is an enlarged view of a portion A of FIG. 3.

Referring to FIGS. 3 and 6, a hole 125 through which the second dust storage 150 passes may be formed at the filter part 120. An accommodation groove 127 in which an upper end of the pressing plate support part 210 of the pressing member 200 is inserted may be formed at a lower side of the filter part 120. A wall supporter 214 having an accommodation groove 213 for accommodation a wall 128 which forms the accommodation groove 127 while the pressing plate support part 210 is accommodated in the accommodation groove 127 may be provided at the pressing plate support part 210.

Since the upper end of the pressing plate support part 210 is inserted into the accommodation groove 127 of the filter part 120, and the wall 128 which extends from the filter part 120 is inserted into the accommodation groove 213 of the wall supporter 214 of the pressing plate support part 210, a dual sealing structure is formed, and thus the dust in the first dust storage 113 may be prevented from being introduced between the pressing plate support part 210 and the second dust storage 150. The accommodation grooves 127 and 213, the wall 128 and the wall supporter 214 may be referred to as a sealing mechanism.

Since the dust is prevented from being introduced between the pressing plate support part 210 and the second dust storage 150, a phenomenon in which the pressing plate support part 210 is not smoothly rotated due to the dust between the pressing plate support part 210 and the second dust storage 150 may be prevented.

A coupling protrusion 212 may be formed at one of an inner circumferential surface of the pressing plate support part 210 and an outer circumferential surface of the second dust storage 150, and a coupling groove 156 in which the coupling protrusion 212 is inserted may be formed at the other one. The coupling protrusion 212 may be elastically deformed, while the second dust storage 150 is inserted into the pressing plate support part 210, and then may be inserted into the coupling groove 156, when being aligned with the coupling groove 156.

As another example, a coupling pin which is separately formed from the pressing plate support part 210 and the second dust storage 150 may pass through the pressing plate support part 210 from an outside of the pressing plate support part 210, and may be inserted into the coupling groove 156 formed at the second dust storage 150. Alternatively, the coupling pin which is separately formed from the pressing plate support part 210 and the second dust storage 150 may pass through the second dust storage 150 from an inside of the second dust storage 150, and may be inserted into the coupling groove 156.

At this time, in either case, in order for the pressing plate support part 210 to be rotated while the pressing plate support part 210 is connected to the second dust storage 150, the coupling groove 156 is formed in a ring shape in a radial direction of the pressing plate support part 210 or the second dust storage 150.

According to the embodiment, since the pressing plate support part 210 is maintained in a coupled state with the second dust storage 150 while the cover assembly 300 is separated from the dust collecting body 110, the pressing member 200 is maintained in a located state in the first dust storage 113. That is, while the cover assembly 300 is separated from the dust collecting body 110, the pressing member 200 may be prevented from being separated from the dust collecting body 110. A blocking part 129 which prevents the dust and air in the first dust storage 113 from raising may be provided at the lower side of the filter part 120.

Figure 5:
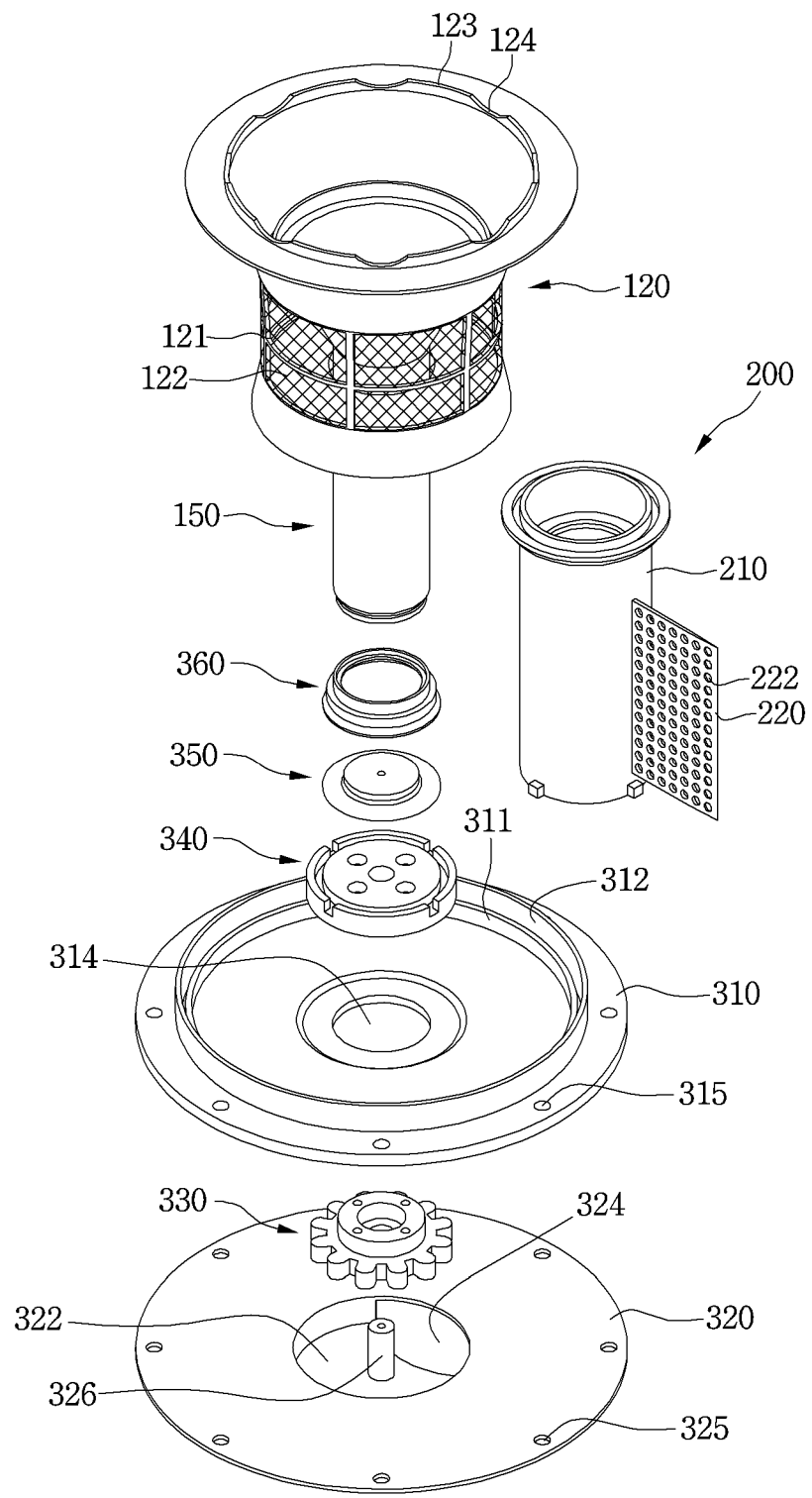
FIG. 5 is an exploded perspective view of the dust collecting apparatus according to the embodiment of the present disclosure.
Figure 7:
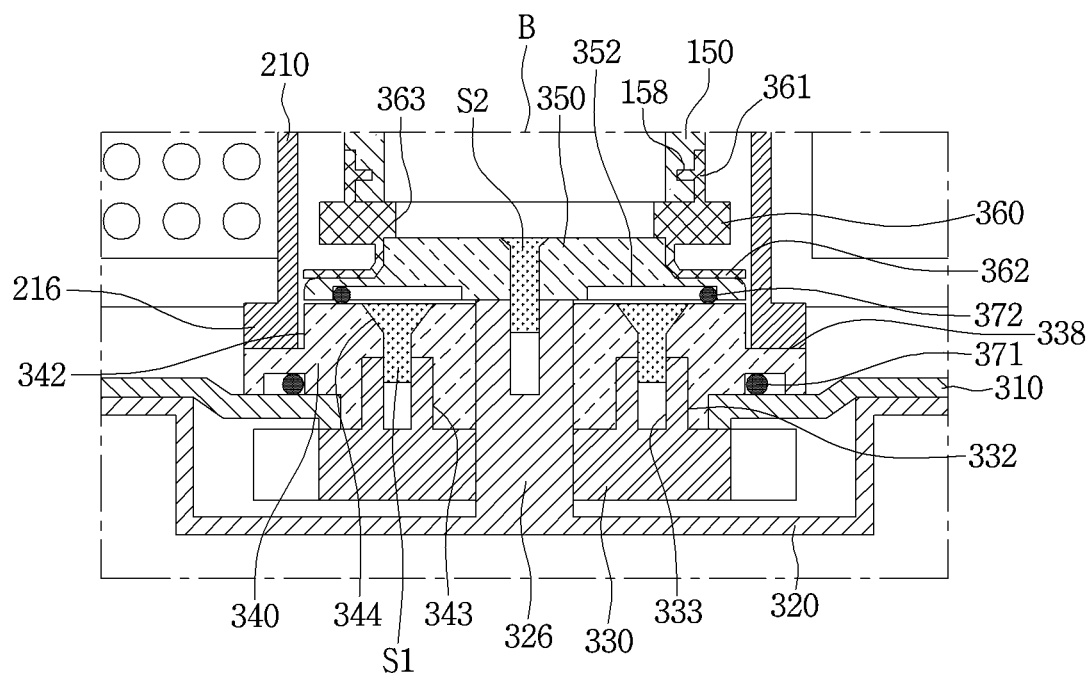
FIG. 7 is an enlarged view of a portion B of FIG. 3.

Referring to FIGS. 3, 5 and 7, the sealing member 360 may be coupled to the lower side of the second dust storage 150. The sealing member 360 may include a coupling part or protrusion 361 for coupling with the second dust storage 150, and a groove 158 in which a part of the coupling part 361 is inserted may be formed at the outer circumferential surface of the second dust storage 150. The sealing member 360 may cover a circumference of the second dust storage 150.

As another example, the coupling part 351 may be fitted into the second dust storage 150.

The sealing member 360 may include a seating part or pad/ring 362 which is seated on the second cover 350 while the cover assembly 300 is coupled to the dust collecting body 110. The seating part 362 is in surface contact with the second cover 350, and may cover an outer circumference of the second cover 350. In other words, a part of the second cover 350 may be inserted into the sealing member 360.

A through-hole 363 through which the dust in the second dust storage 150 passes through may be formed at the sealing member 360. Some of the dust in the second dust storage 150 may be accumulated on the second cover 350. For example, the sealing member may be formed of a deformable material. The sealing member 360 may be formed of a rubber material. Since the sealing member 360 is in surface contact with the second cover 350 and covers the circumference of the second cover 350, the dust stored in the second dust storage 150 may be prevented from leaking to the outside of the second dust storage 150.

The first transmission part 330 may include an insertion part or ring 332 which is inserted into the second transmission part 340, and the second transmission part 340 may include an accommodation part or groove 343 in which the insertion part 332 is inserted. A fastening groove 333 in which a fastening member 51 passed through a fastening hole 344 of the second transmission part 340 is fastened may be formed at the insertion part 332. When the first transmission part 330 is rotated, the second transmission part 340 may also be rotated.

In order for the second transmission part 340 to transmit a rotational force to the pressing plate support part 210, one of the pressing plate support part 210 and the second transmission part 340 may include a transmission protrusion 216, and the other one may include an accommodation groove or recess/ledge 342 in which the transmission protrusion 216 is accommodated.

FIG. 7 illustrates an example in which the transmission protrusion 216 is formed at the pressing plate support part 210, and the accommodation groove 342 is formed at the second transmission part 340. In this case, for example, the transmission protrusion 216 may protrude from the outer circumferential surface of the pressing plate support part 210. In order for the transmission protrusion 216 which protrudes from the outer circumferential surface of the pressing plate support part 210 to be accommodated in the accommodation groove 342 of the second transmission part 340, a part of the second transmission part 340 may be inserted into the pressing plate support part 210.

As another example, the transmission protrusion 216 may protrude downward from a lower surface of the pressing plate support part 210. In this case, while a part of the second transmission part 340 is not accommodated in the pressing plate support part 210, the transmission protrusion 216 may be accommodated in the accommodation groove 342 of the second transmission part 340.

The second cover 350 may be fastened to the shaft 326 of the transmission part cover 320 by a fastening member S2. Therefore, even though the first transmission part 330 and the second transmission part 340 are rotated, the second cover 350 may be maintained in a stopped state. To prevent the dust and air in the first dust storage 113 from leaking to the outside through a gap between the first transmission part 330 and the first cover 310, a first sealing part 371 may be provided at one or more of the first transmission part 330 and the first cover 310. For example, the first sealing part 371 may be an O-ring.

FIG. 7 illustrates an example in which the first sealing part or ring 371 is provided at the first transmission part 330. In this case, a first groove 338 which accommodates the first sealing part 371 may be provided at the first transmission part 330. A second sealing part or ring 372 may be provided at a portion in which the second cover 350 and the second transmission part 340 face each other. For example, the second sealing part 372 may be an O-ring.

The second sealing part 372 may prevent the air and the dust in the first dust storage 113 from passing through a gap between the second cover 350 and the second transmission part 340. The second sealing part 372 may prevent the dust and air, which may be located between the second dust storage 150 and the pressing plate support part 210, from passing through the gap between the second cover 350 and the second transmission part 340.

Figure 8:
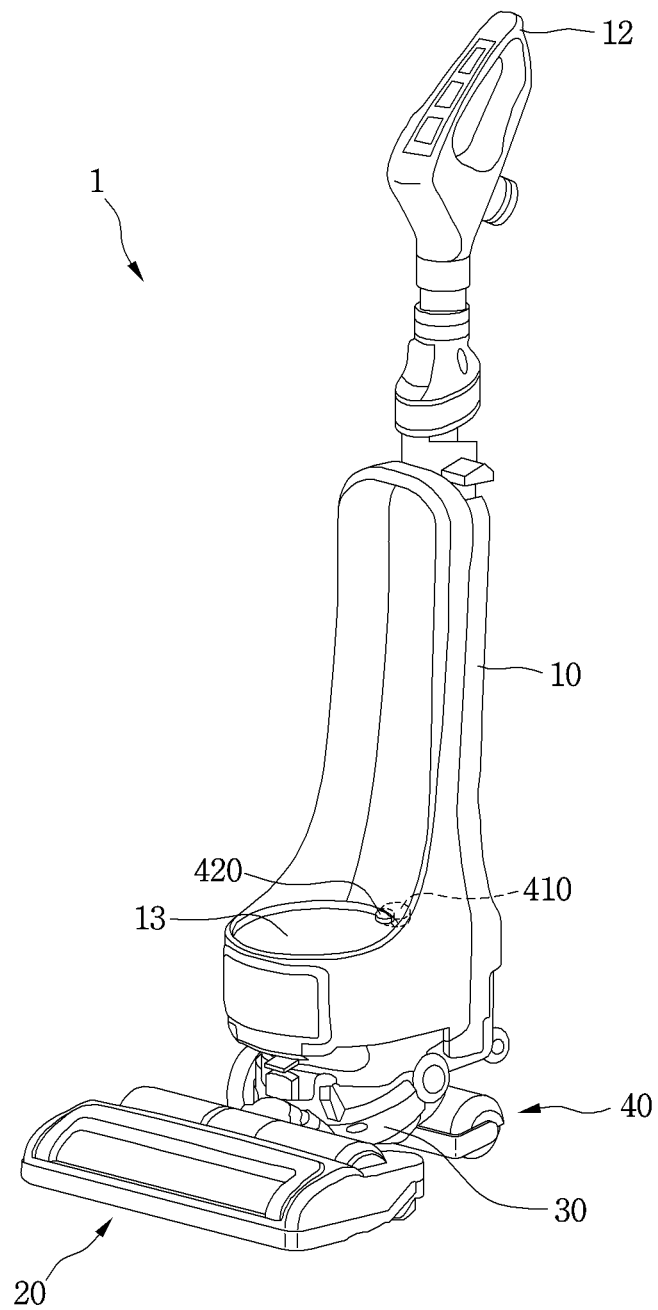
FIG. 8 is a view illustrating a state in which the dust collecting apparatus is separated from the vacuum cleaner of FIG. 1.
Figure 9:
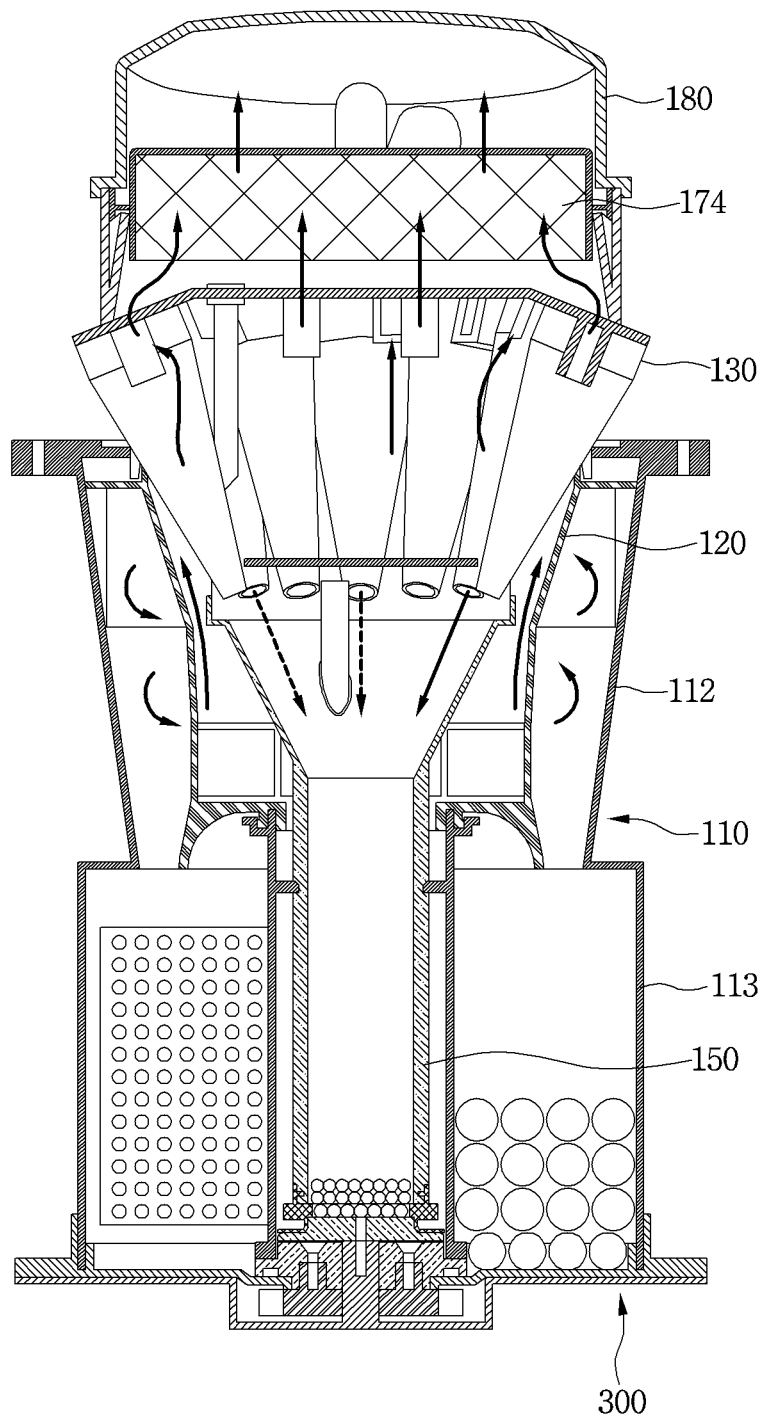
FIG. 9 is a view illustrating a state in which air and dust are moved in the dust collecting apparatus according to the embodiment of the present disclosure.

Referring to FIGS. 5 and 8, the cleaner body 10 may include driving units or components 410 and 420 which drive the pressing member 200. The driving units 410 and 420 may include a driving motor 410, and a driving gear 420 which is connected with the driving motor 410. The cleaner body 10 has an installation part or support 13 at which the dust collecting apparatus 100 is installed, and the driving gear 420 may be exposed to the installation part 13. The driving gear 420 may transmit power of the driving motor 410 to the first transmission part 330. For example, in order for the first transmission part 330 to receive the power of the driving motor 410 from the driving gear 420, the first transmission part 330 may be a gear.

When the dust collecting apparatus 100 is installed at the installation part 13 of the cleaner body 10, the first transmission part 330 may be connected with the driving gear 420. However, when the dust collecting apparatus 100 is separated from the cleaner body 10, connection between the first transmission part 330 and the driving gear 420 may be released.

Referring to FIGS. 1 to 9, when the suction motor provided at the cleaner body 10 is operated, the air and the dust are suctioned through the suction nozzle 20 by a suction force of the suction motor. The air and the dust suctioned through the suction nozzle 20 pass through the supporter 30, and then are introduced into the cleaner body 10. The dust and air flowing through the cleaner body 10 are introduced into the dust collecting apparatus 100.

The dust and air are introduced into the dust collecting apparatus 100 through the first inlet port 111 of the dust collecting apparatus 100. The dust and air passed through the first inlet port 111 are introduced into the first dust separator 112. The dust and air introduced into the first dust separator 112 are separated from each other by a cyclone flow.

The dust which is primarily separated from the air is moved downward and stored in the first dust storage 113. However, the air separated from the dust passes through the hole 122 of the filter part 120, is then moved upward, and introduced into the second dust separator 130 through the second inlet port 132 of the second dust separator 130. The air which is separated from the dust in the first dust separator 112 is divided into and flows through the plurality of first cyclone parts 131 and the one or more second cyclone parts 133.

The air introduced into the second dust separator 130 is separated once more from the dust during the cyclone flow. The dust separated from the air in the second dust separator 130 is discharged from the second dust separator 130 (see dotted line) and then stored in the second dust storage 150. The air separated from the dust in the second dust separator 130 is discharged from each of the cyclone parts 131 and 133 through the air guide 137.

The air discharged from each of the cyclone parts 131 and 133 passes through the filter 174, and is lastly discharged from the dust collecting apparatus 100 through the air discharge port 182 of the exhaust cover 180. The air discharged from the dust collecting apparatus 100 may be introduced into the cleaner body 10, and then may be discharged from the cleaner body 10 to the outside.

While the suction motor is operated, the driving motor 410 is operated. When the driving motor 410 is operated, the driving gear 420 may be rotated in one direction. When the driving gear 420 is rotated in one direction, the first transmission part 330 may be rotated in the other direction by the rotational force of the driving gear 420.

The second transmission part 340 is rotated in the same direction as that of the first transmission part 330, and the pressing member 200 may be rotated in the same direction as that of the second transmission part 340. Due to rotation of the pressing member 200, the dust (in the first dust storage) between the fixed member 250 and the pressing plate 220 of the pressing member 200 may be compressed.

According to the embodiment, since the dust stored in the first dust storage 113 may be compressed, a volume of the dust stored in the first dust storage 113 is reduced, and thus a dust storage capacity of the first dust storage 113 may be increased. Since the dust in a compressed state is stored in the first dust storage, the dust may be prevented from being scattered while the dust is discharged.

While the pressing member 200 is rotated, a rotational direction of the pressing member 200 may be varied. A method of changing the rotational direction of the pressing member 200 may be realized by a well-known technique, and thus detailed description thereof will be omitted.

Figure 10:
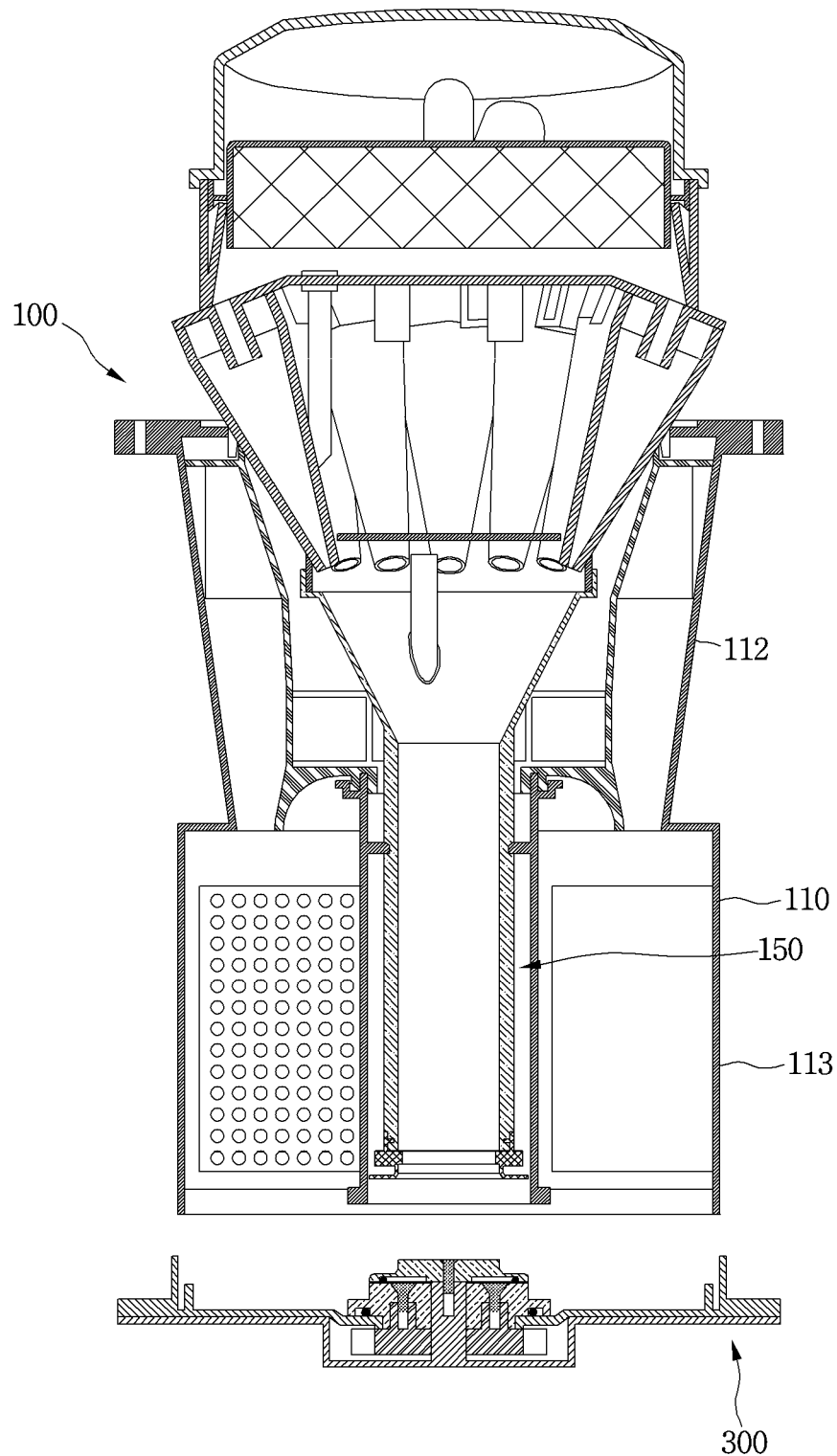
FIG. 10 is a view illustrating a state in which a cover assembly is separated from the dust collecting apparatus according to the embodiment of the present disclosure.

Referring to FIG. 10, to remove the dust stored in the first dust storage 113 and the second dust storage 150, the cover assembly 300 may be separated from the dust collecting apparatus 100. The dust stored in the first dust storage 113 and the second dust storage 150 may fall down from the dust collecting body 110. As described above, while the cover assembly 300 is separated from the dust collecting apparatus 100, the pressing member 200 is maintained in the first dust storage 113.

A dust collecting apparatus has an enhanced dust separation function and is able to compress dust, and a vacuum cleaner having the same. A dust collecting apparatus may include a first dust separator configured to primarily separate dust from suctioned air; a first dust storage configured to store the dust separated in the first dust separator; a pressing member configured to compress the dust stored in the first dust storage, and having a pressing plate support part and a pressing plate supported by the pressing plate support part; a second dust separator configured to separate once more dust from the air passed through a dust separation process in the first dust separator; and a second dust storage configured to store the dust separated in the second dust separator, and located at an inside of the pressing plate support part.

The pressing plate support part may be rotated in the first dust storage. The pressing plate support part may be rotatably connected to the second dust storage.

A coupling protrusion may be provided at one of an inner circumferential surface of the pressing plate support part and an outer circumferential surface of the second dust storage, and a coupling groove in which the coupling protrusion is coupled may be provided at the other one. The apparatus may further include a coupling pin configured to pass through one of the pressing plate support part and the second dust storage. A coupling groove in which the coupling pin is inserted may be provided at the other one of the pressing plate support part and the second dust storage.

The apparatus may further include a filter part configured to filter the air separated in the first dust separator. A part of the second dust storage may be located within the filter part.

The apparatus may further include a sealing mechanism configured to prevent the air and dust from being introduced between the pressing plate support part and the second dust storage. The sealing mechanism may include an accommodation groove provided at the filter part and in which an upper portion of the pressing plate support part is inserted. The sealing mechanism may include a wall supporter provided at the pressing plate support part and configured to form an accommodation groove for accommodating a wall extending from the filter part.

The apparatus may further include a cover assembly configured to open and close the first dust storage and the second dust storage.

The cover assembly may include a first cover configured to open and close the first dust storage and a second cover configured to open and close the second dust storage. While the first cover closes the first dust storage, the second cover may be located within the pressing plate support part.

A sealing member configured to prevent the dust stored in the second dust storage from leaking to an outside of the second dust storage may be coupled to one of the second dust storage and the second cover. The sealing member may cover a circumference of the first dust storage, and a part of the second cover may be inserted into the sealing member.

The cover assembly may further include a transmission mechanism configured to transmit external power to the pressing member, and the transmission mechanism may be connected to the pressing plate support part of the pressing member.

The cover assembly may further include a sealing part configured to prevent the air and dust in the first dust storage from leaking between the transmission mechanism and the first cover. The cover assembly may further include a sealing part configured to prevent the air and dust between the pressing plate support part and the second dust storage from leaking between the transmission mechanism and the second cover.

The cover assembly may further include a transmission part cover having a shaft configured to rotatably support the transmission mechanism, and the transmission mechanism may include a first transmission part rotatably connected to the shaft, and a second transmission part coupled to the first transmission part and connected to the pressing plate support part. The second cover may be fastened to the shaft by a fastening member.

A transmission protrusion may be provided at one of the second transmission part and the pressing plate support part, and an accommodation groove which accommodates the transmission protrusion may be provided at the other one.

The second dust separator may include a plurality of first cyclone parts, and one or more second cyclone parts located within an area formed by the plurality of first cyclone parts.

A vacuum cleaner may include a cleaner body; and a dust collecting apparatus separably installed at the cleaner body. The dust collecting apparatus may include a first dust separator configured to primarily separate dust from suctioned air; a first dust storage configured to store the dust separated in the first dust separator; a pressing member provided in the first dust storage and having a pressing plate support part and a pressing plate supported by the pressing plate support part; a second dust separator configured to separate once more dust from the air passed through a dust separation process in the first dust separator; and a second dust storage configured to store the dust separated in the second dust separator, and located at an inside of the pressing plate support part.

In the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Even though all the elements of the embodiments are coupled into one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner comprising: a dust collecting apparatus comprising: a first dust separator configured to separate dust from suctioned air; a filter disposed in the first dust separator to filter the air separated in the first dust separator; a first dust storage configured to store the dust separated in the first dust separator; a pressing plate support cylinder and a pressing plate coupled to the pressing plate support cylinder and configured to compress the dust inside the first dust storage; a second dust separator configured to separate dust from the air which has passed through the first dust separator; a second dust storage configured to store the dust separated in the second dust separator, and located inside of the pressing plate support cylinder; and an accommodation groove formed at a lower side of the filter, wherein an upper end of the pressing plate support cylinder is inserted into the accommodation groove to prevent dust in the first dust storage from being introduced between the pressing plate support cylinder and the second dust storage, and wherein the second dust separator comprises a plurality of first cyclones, and at least one second cyclone, the plurality of first cyclones surrounding the at least one second cyclone.

2. The vacuum cleaner according to claim 1, wherein the pressing plate support cylinder is rotatably coupled to the outside of storage body.

3. The vacuum cleaner according to claim 2, wherein a coupling protrusion is provided at an inner circumferential surface of the pressing plate support cylinder, and a coupling groove in which the coupling protrusion is coupled is provided at an outer circumferential surface of the storage body, or vice versa.

4. The vacuum cleaner according to claim 2, further comprising a coupling pin configured to pass through the pressing plate support cylinder, and a coupling groove in which the coupling pin is inserted is provided at the storage body or vice versa.

5. The vacuum cleaner according to claim 1, further comprising: a seal to prevent the air and dust from being introduced between the pressing plate support cylinder and the second dust storage, wherein the seal includes the accommodation groove formed at the lower side of the filter.

6. The vacuum cleaner according to claim 5, wherein the seal further comprises a wall supporter provided at the pressing plate support cylinder and configured to form an accommodation groove to receive a wall extending from the filter.

7. The vacuum cleaner according to claim 1, further comprising a cover assembly configured to open and close the first dust storage and the second dust storage.

8. The vacuum cleaner according to claim 7, wherein the cover assembly comprises a first cover configured to open and close the first dust storage and a second cover configured to open and close the second dust storage.

9. The vacuum cleaner according to claim 8, wherein, the second cover is located within the pressing plate support cylinder when the cover assembly closes the first and second dust storages.

10. The vacuum cleaner according to claim 8, wherein a sealing ring prevents the dust stored in the second dust storage from leaking to an outside of the second dust storage is coupled to one of the second dust storage and the second cover.

11. The vacuum cleaner according to claim 10, wherein the sealing ring covers a circumference of the first dust storage, and a part of the second cover is inserted into the sealing ring.

12. The vacuum cleaner according to claim 8, wherein the cover assembly further comprises at least one transmission gear configured to transmit external power to the pressing plate support cylinder.

13. The vacuum cleaner according to claim 12, wherein the cover assembly further comprises a ring configured to prevent the air and dust in the first dust storage from leaking between the at least one transmission gear and the first cover.

14. The vacuum cleaner according to claim 12, wherein the cover assembly further comprises a ring configured to prevent the air and dust between the pressing plate support cylinder and the second dust storage from leaking between the at least one transmission gear and the second cover.

15. The vacuum cleaner according to claim 12, further comprising a transmission cover having a shaft, and at least one transmission gear includes a first transmission gear rotatably connected to the shaft, and a second transmission gear coupled to the first transmission gear and connected to the pressing plate support cylinder.

16. The vacuum cleaner according to claim 15, wherein the second cover is fastened to the shaft by a fastener.

17. The vacuum cleaner according to claim 15, wherein one of a transmission protrusion or an accommodation groove which accommodates the transmission protrusion is provided at the second transmission gear, and another one of the transmission protrusion or the accommodation groove which accommodates the transmission protrusion is provided at the pressing plate support cylinder.

18. A vacuum cleaner comprising: a cleaner body; and a dust collecting apparatus separably installed at the cleaner body, wherein the dust collecting apparatus comprises a first dust separator configured to primarily separate dust from suctioned air; a filter disposed in the first dust separator and configure to filter the air separated in the first dust separator; a first dust storage configured to store the dust separated in the first dust separator; a pressing member provided in the first dust storage and having a pressing plate support cylinder and a pressing plate supported by the pressing plate support cylinder; a second dust separator configured to separate once more dust from the air passed through a dust separation process in the first dust separator; a second dust storage configured to store the dust separated in the second dust separator, and located at an inside of the pressing plate support cylinder; and an accommodation groove are formed at a lower side of the filter, and wherein an upper end of the pressing plate support cylinder is inserted into the accommodation groove to prevent the dust in the first dust storage from being introduced between the pressing plate support cylinder and the second dust storage, and wherein the second dust separator comprises a plurality of first cyclones, and at least one second cyclone, the plurality of first cyclones surrounding the at least one second cyclone.

* * * * *